(12) United States Patent
Gyoten et al.

(10) Patent No.: US 7,005,205 B1
(45) Date of Patent: Feb. 28, 2006

(54) POLYMER ELECTROLYTE FUEL CELL

(75) Inventors: Hisaaki Gyoten, Shijonawate (JP); Osamu Sakai, Moriguchi (JP); Kazuhito Hatoh, Osaka (JP); Junji Niikura, Hirakata (JP); Hideo Ohara, Katano (JP); Kazufumi Nishida, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/069,900

(22) PCT Filed: Aug. 30, 2000

(86) PCT No.: PCT/JP00/05897

§ 371 (c)(1),
(2), (4) Date: Feb. 26, 2002

(87) PCT Pub. No.: WO01/18895

PCT Pub. Date: Mar. 15, 2001

(30) Foreign Application Priority Data

Sep. 2, 1999 (JP) .................................. 11/248349

(51) Int. Cl.
*H01M 2/00* (2006.01)

(52) U.S. Cl. .............................. 429/34; 429/30; 429/38; 429/40; 427/115

(58) Field of Classification Search .................. 429/44, 429/34, 38, 40, 30; 252/500, 511; 427/115, 427/419.6, 113, 122, 193, 195, 201, 222

See application file for complete search history.

(56) References Cited

U.S. PATENT DOCUMENTS

| | | | | |
|---|---|---|---|---|
| 5,607,785 A | * | 3/1997 | Tozawa et al. | 429/33 |
| 6,030,552 A | * | 2/2000 | Ambros et al. | 252/502 |
| 6,348,279 B1 | * | 2/2002 | Saito et al. | 429/34 |
| 6,451,469 B1 | * | 9/2002 | Nakamura et al. | 429/36 |
| 6,660,419 B1 | * | 12/2003 | Nishida et al. | 429/32 |
| 2002/0034672 A1 | * | 3/2002 | Saito et al. | 429/34 |

FOREIGN PATENT DOCUMENTS

| | | |
|---|---|---|
| JP | 60-60871 | 4/1985 |
| JP | U-60-60871 | 4/1985 |

(Continued)

*Primary Examiner*—Raymond Alejandro
(74) *Attorney, Agent, or Firm*—Akin Gump Strauss Hauer & Feld, LLP

(57) ABSTRACT

A polymer-electrolyte fuel cell having: an electrolyte membrane-electrode assembly having a polymer-electrolyte membrane and a pair of gas-diffusion electrodes sandwiching the polymer-electrolyte membrane; a first electroconductive separator having a gas channel for supplying an oxidant gas to one of the gas-diffusion electrodes of said pair; and a second electroconductive separator having a gas channel for supplying a fuel gas to the other of the gas-diffusion electrodes of the pair. The polymer-electrolyte fuel cell is characterized in that: at least one of the first and second electroconductive separators has a metal substrate and an electroconductive resin layer on the substrate and contacting the electrolyte membrane-electrode assembly; and the electroconductive resin layer has a resin having water-repellant or basic radicals, and an electroconductive particulate substance which has a carbon powder of a specific surface area of less than 100 $m^2/g$.

2 Claims, 2 Drawing Sheets

FOREIGN PATENT DOCUMENTS

| | | |
|---|---|---|
| JP | 3-164413 | 7/1991 |
| JP | 06-333580 | 12/1994 |
| JP | 11-126620 | 5/1999 |
| JP | 11-144744 | 5/1999 |
| JP | 11-345618 | 12/1999 |
| JP | 2000-100452 | 4/2000 |
| JP | 2000-138067 | 5/2000 |
| WO | WO99/19927 A | 4/1999 |

* cited by examiner

POLYMER ELECTROLYTE FUEL CELL

TECHNICAL FIELD

The present invention relates to polymer-electrolyte fuel cells useful as consumer co-generation systems and mobile power-generating appliances.

BACKGROUND ART

In the gas-diffusion electrodes of fuel cells, a fuel gas such as hydrogen and an oxidant gas such as air react electrochemically, so as to supply electricity and heat simultaneously. Owing to the variety of electrolytes with which they are equipped, there are several types of fuel cells.

Polymer-electrolyte fuel cells are furnished with electrolyte membrane-electrode assemblies (MEAs), made up of a polymer-electrolyte membrane and a pair of gas-diffusion electrodes sandwiching the membrane. The polymer-electrolyte membrane for example has a —$CF_2$— skeleton and comprises a perfluorocarbon sulfonic acid having sulfonic acids on the terminal ends of its side chains.

The gas-diffusion electrodes comprise a catalyst layer contiguous with the polymer-electrolyte membrane and, arranged on the outer face of the catalyst layer, an electrode substrate having gas-permeable and electroconductive properties. The catalyst layer comprises a carbon powder carrying a platinum-system metal.

An electroconductive separator for affixing an MEA, and at the same time electrically interconnecting in series neighboring MEAs, is arranged on the outer face of the MEA. The electroconductive separator has a gas-supplying channel for the fuel gas or the oxidant gas to the gas-diffusion electrodes, and for conveying a surplus gas and water created by the reaction of hydrogen and oxygen.

Seals such as gaskets are arranged encompassing the gas channels on the electroconductive separator and the gas-diffusion electrodes, and they prevent intermixing and outward leakage of the gases.

To heighten output voltage in procuring power-generating devices, a plurality of individual single cells, composed of an MEA and a pair of electroconductive separators having gas channels, are laminated. A fuel gas and an oxidant gas are supplied from the exterior through a manifold to each gas channel. Electric current generated through the electrode reactions is then collected at the electrode substrates and taken out to the exterior through the electroconductive separator.

Electroconductive separators are often made from a carbon material having gas-tight and anticorrosive properties. Likewise, electroconductive separators utilizing a metal substrate such as stainless steel have been investigated from the viewpoints of manufacturing cost, as well as ease of working and thinning the electroconductive separator.

Due to long-term exposure to high-humidity gases, electroconductive separators utilizing metal substrates require strong corrosion resistance. Furthermore, in order to heighten the electric cells' power-generating efficiency, suppressing contact resistance between the electroconductive separator and the MEA also becomes important. Therein, if for example a stainless-steel sheet is utilized as a metal substrate, by forming a passive state layer consisting of chromium oxide on the obverse face of the stainless-steel sheet, its corrosion resistance is heightened.

Nevertheless, because forming the comparatively thick and stable passive state layer on the obverse face of the metal substrate makes the passive state layer an electrical resistor, the contact resistance increases. High-output cells consequently cannot be procured. Conversely, if the passive state layer is unstable, the metal substrate will corrode, and the MEA will undergo damage due to the metal ions leached.

A method of establishing on the obverse face of the metal substrate a layer obtained by means of chemical-plating or vapor-depositing an anticorrosive metal such as gold has been investigated. Lowering costs, however, is difficult.

A method of coating onto the obverse face of the metal substrate a resin composition in which a carbon powder is dispersed into cellulose, poly(vinyl chloride), epoxy resin, etc. has also been investigated. Nevertheless, there are problems with the durability.

A method of forming a layer on the obverse face of the metal substrate in order to heighten its corrosion resistance, and meanwhile arranging, in the area where the separator and the MEA contact, an electroconductive particulate substance of high hardness in order to form an electroconductive path by penetrating the aforementioned layer, has also been investigated. This method is comparatively low-cost. Nevertheless, when the cells are run long-term, in the end metal ions leach out and the MEA undergoes damage.

DISCLOSURE OF INVENTION

The present invention relates to a polymer electrolyte fuel cell made up of: an electrolyte membrane-electrode assembly comprising a polymer-electrolyte membrane, and a pair of gas-diffusion electrodes sandwiching the polymer-electrolyte membrane; a first electroconductive separator having a gas channel for supplying an oxidant gas to one of the gas-diffusion electrodes of the pair; and a second electroconductive separator having a gas channel for supplying a fuel gas to the other of the gas-diffusion electrodes of the pair; wherein the polymer-electrolyte fuel cell is characterized in that: at least one of the first electroconductive separator and the second electroconductive separator comprises a metal substrate and an electroconductive resin layer provided on the metal substrate and contacting the electrolyte membrane-electrode assembly; and the electroconductive resin layer comprises a resin having water-repellant or basic radicals, and an electroconductive particulate substance.

Here, on the one surface of the first electroconductive separator or the second electroconductive separator there may be a gas channel for supplying an oxidant gas to one of the gas-diffusion electrodes of one MEA, and on the other surface there may be a gas channel for supplying a fuel gas to one of the gas-diffusion electrodes of another MEA.

The electroconductive particulate substance may preferably comprise a carbon powder having a specific surface area of less than 100 $m^2/g$.

Further, the electroconductive particulate substance may preferably comprise vitreous carbon.

A polymer-electrolyte fuel cell in accordance with the present invention may preferably have, between the metal substrate and the electroconductive resin layer, a layer including at least one selected from the group consisting of: metallic Zn, metallic Sn, metallic Al, Cr-containing compounds, Mo-containing compounds and W-containing compounds.

BEST MODE FOR CARRYING OUT THE INVENTION

Figure 1:
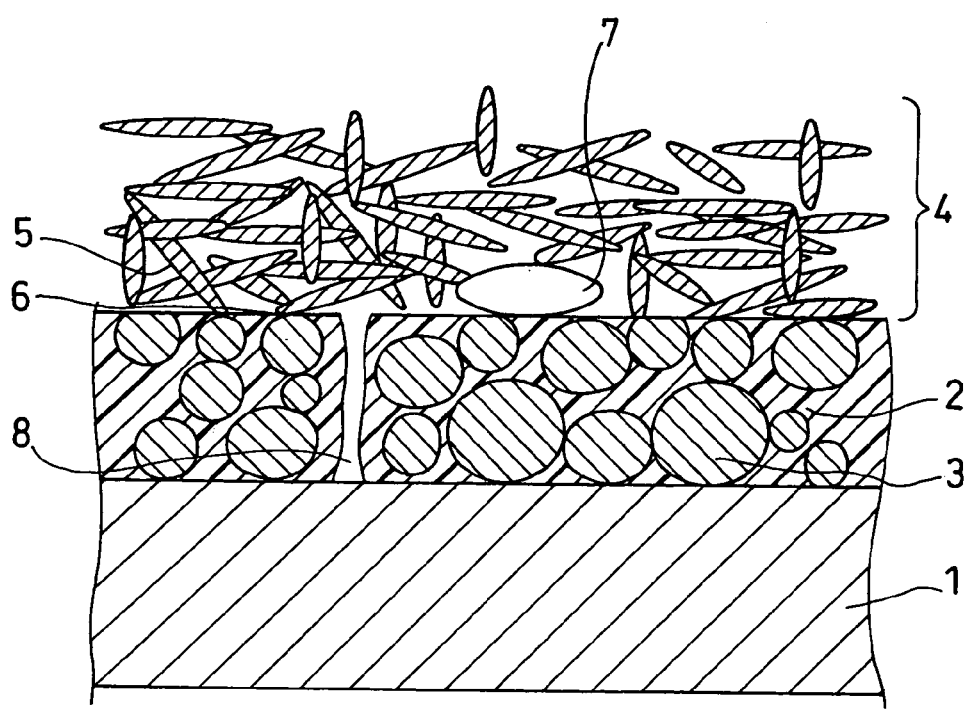
FIG. 1 is a schematic sectional view of contacting portions of an electroconductive separator and a gas-diffusion electrode relating to the present invention.

The oxidant gas and fuel gas supplied to the polymer-electrolyte fuel cell must be humidified in order to sustain the conductivity of the polymer-electrolyte membrane. Likewise, water is produced at the cathode by galvanic reaction. Accordingly, water vapor is thought to condense, while the cell is in operation, in the area where the electroconductive separators and the gas-diffusion electrodes contact. Carbon dioxide gas and ionic impurities then dissolve in the condensed water vapor. Corrosion of the metal substrate in the electroconductive separator develops as a result.

The electroconductive separator of the present invention is made up of a metal substrate, and electroconductive resin layer provided on the surface of the metal substrate. Then the gas-diffusion electrodes are contacted on the electroconductive resin layer. The electroconductive resin layer is made from a resin having water-repellant or basic radicals that are dispersed with an electroconductive particulate substance. Here, the resin may include both water-repellant radicals and basic radicals.

When utilized, the resin having water-repellant radicals in the electroconductive resin layer owing to its water repellency keeps ionically conductive water from permeating the electroconductive resin layer and reaching the surface of the metal substrate. Accordingly, even if pinholes might be present in the electroconductive resin layer, corrosion due to water passing through them and coming into contact with the metal substrate is restrained.

Fluorine-atom-containing radicals such as —F, —$CF_3$, —$CF_2$— and pentafluorophenyl group may be cited as water-repellent radicals.

Meanwhile, the corrosion resistance of alloys such as stainless steel is heightened by a passive state oxide layer formed on the surface. The stability of the passive state layer varies according to the ambient pH. The passive state layer will corrode in acidic atmospheres, and the amount of ions that leach from stainless steel will be large. Leached metal ions enter polymer-electrolyte membranes in place of hydrogen ions, deteriorating the hydrogen-ionic conductivity of the membranes. Likewise, metal ions are thought to lower the water content of polymer-electrolyte membranes, and to impair the catalytic activity of platinum.

In that respect, utilizing in the electroconductive resin layer a resin having basic radicals heightens the surficial pH of the separator, and stabilizes the passive state layer. Consequently, leaching of metal ions while the cell is in operation is restrained for an extended period.

Nitrogen-atom-containing radicals such as amino groups, amide groups, imide groups may be cited as basic radicals. Wherein the resin includes these radicals, the corrosion resistance of the electroconductive separator is thought to improve because the oxide layer on the adjoining metal surface is stabilized by an electron-pair of the nitrogen atom.

Further, leaching of metal ions from the metal substrate is restrained by arranging on the surface of the metal substrate a layer containing a metal, such as Zn, Sn or Al, whose ionization tendency is greater than the metal in the metal substrate. Likewise, leaching of metal ions from the metal substrate is also restrained by forming onto the metal-substrate surface a layer comprising an oxide or hydroxide of Cr, Mo, W or the like.

In order to gain high electroconductivity, a sufficient quantity of the electroconductive particulate substance must be incorporated in the electroconductive resin layer. Nevertheless, because metal ions created in the surface of the metal substrate leach to the exterior of the electroconductive separator due to dispersing on the interface between the resin and the electroconductive particles, the specific surface area of the electroconductive particulate substance desirably should be small.

Powders of metal oxides, metal nitrides, metal carbides or the like that are to a certain extent anticorrosive are effective as the electroconductive particulate substance. For example, powders of carbon, titanium, ruthenium oxide, titanium nitride or titanium carbide are effective. Moreover, among these a carbon powder in particular is effective.

The carbon powder preferably consists of layered graphite, flake graphite or vitreous carbon. Further, among these a vitreous-carbon powder is preferable. This is because metal ions are thought to disperse through the spacing of layers in the layered graphite and leach to the exterior. Likewise, mixing together and utilizing a highly electroconductive layered graphite powder and an amorphous carbon powder such as a vitreous carbon powder is preferable in terms of balance between electroconductivity and control of metallic ion elution.

The amount of electroconductive particulate substance contained in the electroconductive resin layer is, generally, 100–900 parts by weight per 100 parts by weight resin.

Because the passive state layer on the surface of the metal substrate will cause an increase in the contact resistance, in situations where corrosion is not a problem, the passive state layer preferably is eliminated prior to forming the electroconductive resin layer. Here, in point of corrosion resistance the metal substrate preferably comprises stainless steel or carbon steel. A metal substrate comprising a metal of low corrosion resistance, such as aluminum, may be utilized for the present invention, however.

Examples of electrode substrates that may be given are: carbon papers; carbon clothes obtained by weaving carbon fibers; and carbon felts obtained by molding a mixture of carbon fibers and carbon powders to which a fibrous binder is added.

As a polymer-electrolyte membrane, those that have conventionally been utilized in the MEAs of polymer-electrolyte fuel cells may be used.

EMBODIED EXAMPLE 1

A catalyst powder in which 75 parts by weight acetylene black (180 $m^2$/g specific surface area) carries 25 parts by weight platinum particles (approx. 30 Å mean particle diameter) was prepared. A paste was obtained by mixing a dispersion liquid consisting of this catalyst powder and isopropanol, and a dispersion liquid consisting of the perfluorocarbon sulfonic acid powder indicated by chem. formula (1) and ethanol. The perfluorocarbon sulfonic acid inclusion quantity is 30 parts by weight per 100 parts by weight catalyst powder.

Formula (1):

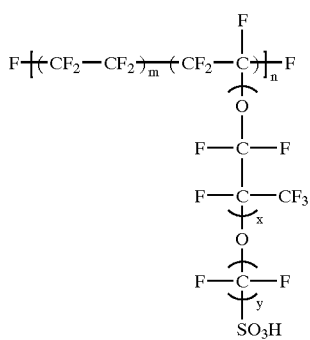

wherein:
m = 5–13.5
n ≈ 1000
x = 1
y = 2

Next, a carbon paper 300 μm in thickness, which would become the substrate for the gas-diffusion electrodes, was prepared. Then, on one surf ace thereof a layer 40 μm in thickness of a carbon powder 180 m²/g specific surface area), repellency-treated with polytetrafluoroethylene (PTFE) in an aqueous dispersion (PTFE inclusion quantity was 200 parts by weight per 100 parts by weight carbon powder), was provided. Subsequently, by applying the aforementioned paste onto this layer, a catalyst layer approximately 30 μm in thickness was built to yield a gas-diffusion electrode.

A polymer-electrolyte membrane was sandwiched in a pair of the gas-diffusion electrodes, putting the catalyst layers inwards, and hot-pressed 30 sec. at 110° C., to obtain an MEA. "Nafion 112" (Du Pont Corp., mfr.; thickness: 50 μm) was utilized as the polymer-electrolyte membrane.

Next, 2 stainless-steel sheets (SUS 316) 500 μm in thickness were prepared. Likewise, a resin composition for building the electroconductive resin layer was prepared. The resin composition was obtained by knead-blending, in a planetary ball-mill, a mixture of a fluoroelastomer (copolymer powder composed of $CF_2=CF-CF=CF_2$, $CH_3-CF=CF_2$, $CF_2=CF_2$ or the like), flake graphite, and methylethyl ketone (10:50:40 weight proportion). The fluoroelastomer has water-repellent properties. This resin composition was applied and dried onto one side of the stainless-steel sheets, forming on each an electroconductive resin layer 15 μm in thickness. Subsequently, a hydrogen gas channel was formed on one of the stainless-steel sheets—in its surface having the electroconductive resin layer—and an air channel was formed on the other stainless-steel sheet—in its surface having the electroconductive resin layer—which yielded a pair of electroconductive separators. The gas channels were built by pressing the stainless-steel sheet having the electroconductive resin layer to form gas-conducting groove or rib, and assembling this with an insulating sheet having elasticity. The insulating sheet was formed by a punching process, and a channel was formed that, cooperating with the aforementioned groove in or rib on the stainless-steel sheet, leads gases from its supply-side to its discharge side, while functioning as a gasket that prevents gases from leaking from the aforementioned channel to the exterior (see W000/01025).

The MEA, peripherally on which a silicone rubber gasket was arranged, was sandwiched with the obtained pair of electroconductive separators to obtain a single cell. At this time, the electroconductive resin layers on the electroconductive separators and the outer surfaces of the MEA gas-diffusion electrodes were brought into contact.

In this cell, the electricity generated by the MEA may be taken out to the exterior by way of the surfaces of the gas-diffusion electrodes that contact with the electroconductive separator, and the electroconductive separator. In practice, a laminated cell is formed in which a plurality of cells of this sort and cooling cells for flowing a cooling medium such as cooling water are laminated, but in the present embodiment, the example of a single cell is explained.

FIG. 1 is a sectional schematic diagram of contacting portions of an obtained electroconductive separator and gas-diffusion electrode. In FIG. 1, 1 is the stainless-steel sheet (SUS 316), and 2 indicates the electroconductive resin layer built on the surface thereof. Electroconductive particles (flake graphite particles) 3 for securing electroconductive properties are dispersed within the electroconductive resin layer 2. The electroconductive particles 3 are in mutual contact, or are adjacent enough to have electroconductivity. The carbon paper part of the gas-diffusion electrode is 4; and 5 is a carbon fiber that constitutes the carbon paper.

Water 7 that is condensed water vapor is present on the interface 6 between the carbon paper and the electroconductive resin layer, but contact between the water 7 and the stainless-steel sheet 1 is blocked by the electroconductive resin layer 2. Moreover, because the electroconductive resin layer 2 is water repellent, though a pinhole 8 is present in the electroconductive resin layer 2, the water 7 cannot pass through the pinhole 8.

Durability testing was next carried out on the obtained single cell. Here, the electrode surface area is 25 cm² (5-cm square), and 0.3 mg/cm² Pt is contained respectively in the catalyst layers on the cathode and the anode. Hydrogen gas was supplied to the anode, and air to the cathode. Likewise, the cell temperature was set to 75° C., the fuel consumption rate to 70%, and the air consumption rate to 30%. Furthermore, the gases were humidified so that the dew point of the hydrogen gas would be 75° C., and of the air, 60° C. The relationship between cell voltage and running time when the single cell was operated continuously at a current density of 0.5 A/cm² is shown by a in FIG. 2.

EMBODIED EXAMPLE 2

A resin composition was obtained by knead-blending while adding to flake graphite an aqueous dispersion of a copolymer of tetrafluoroethylene and hexafluoropropylene, and partially vaporizing the water. Copolymers of tetrafluoroethylene and hexafluoropropylene are water repellent. The weight proportion of the flake graphite to the resin component in this resin composition was 50:10. An electroconductive separator was fabricated that, apart from utilizing this resin composition, was the same as in Embodied Example 1, and the same evaluation was made. The results are shown by b in FIG. 2.

COMPARATIVE EXAMPLE 1

A resin composition was obtained by knead-blending in a planetary ball-mill a mixture composed of poly(vinyl chloride), flake graphite, and methyl ethyl ketone (10:50:40 weight proportion). An electroconductive separator was fabricated that, apart from utilizing this resin composition, was the same as in Embodied Example 1, and the same evaluation was made. The results are shown by c in FIG. 2.

COMPARATIVE EXAMPLE 2

A resin composition was obtained by knead-blending in a planetary ball-mill a mixture composed of polymethylacrylate, flake graphite, and water (5:45:50 weight proportion). An electroconductive separator was fabricated that, apart from utilizing this resin composition, was the same as in Embodied Example 1, and the same evaluation was made. The results are shown by d in FIG. 2.

Figure 2:
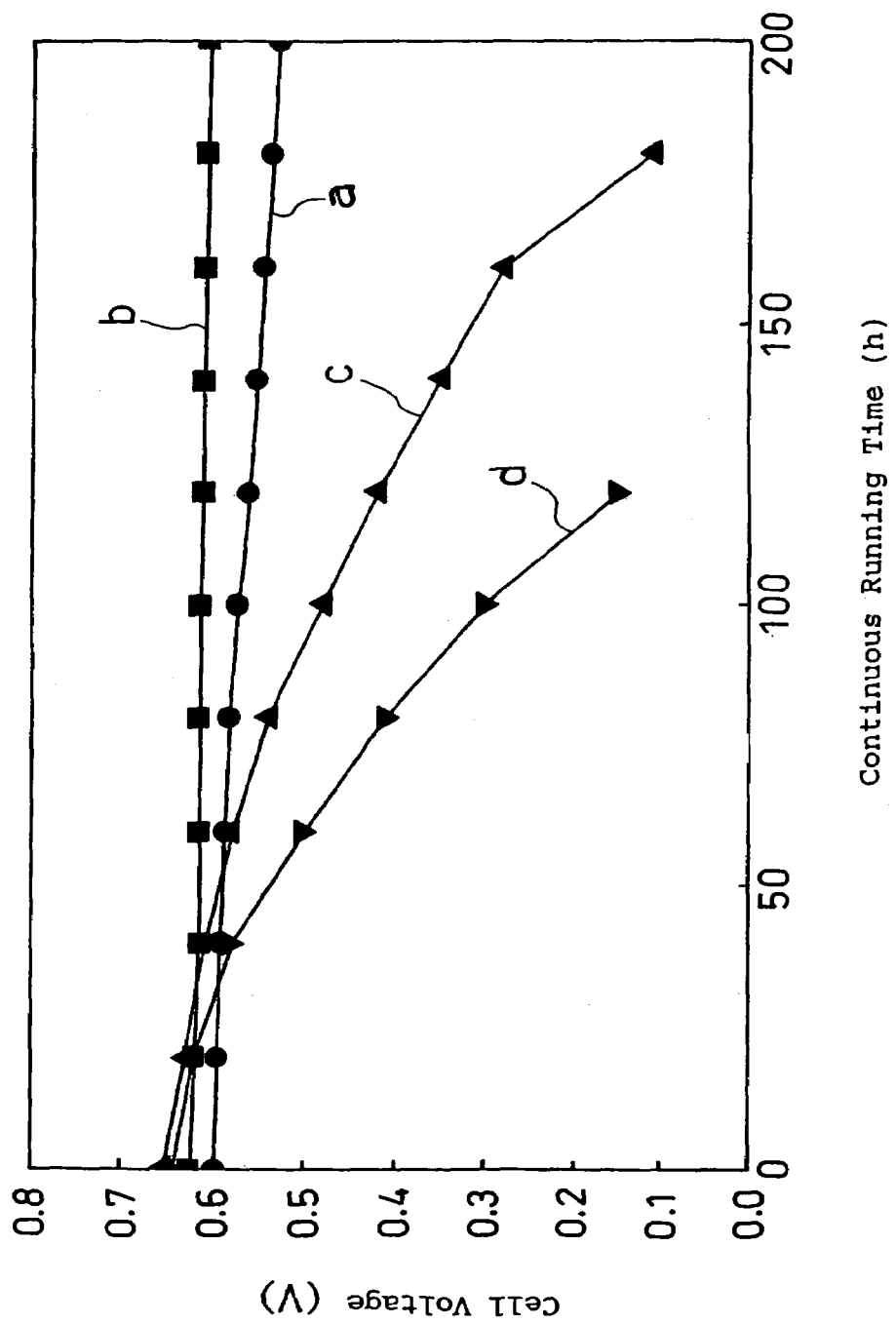
FIG. 2 is a plot indicating results of a durability test on a single cell manufactured in an embodiment of the present invention.

As is clear from FIG. 2, voltage deteriorated in a short time interval following the start of operation with the cells in which the poly(vinyl chloride) and acrylic resin were utilized in the electroconductive resin layer. On the other hand, with the cells in which the fluoroelastomer and fluoropolymer were utilized, no significant drop in voltage was recognized even after the elapse of a long time interval.

Therein, in order to ascertain the water repellency of the electroconductive resin layer, the water contact angle was measured in smooth, flat locations on each electroconductive resin layer. The result was that the electroconductive resin layer for which the contact angle was largest was that in which the copolymer of tetrafluoroethylene and hexafluoropropylene was utilized. Likewise, the contact angles turned out to be smaller in the order of: fluoroelastomer>poly(vinyl chloride)>acrylic resin. It was understood therefrom that the greater the water repellency of the electroconductive resin layer, the more highly durable will the fuel cell be.

EMBODIED EXAMPLE 3

An instance in which a resin having basic radicals is utilized will be explained. In the present embodied example, a resin composition was obtained utilizing flake graphite as an electroconductive particulate substance, and utilizing a poly(amide-imide) resin made by Hitachi Chemical Co., Ltd. as the resin and Cellosolve acetate as the solvent. The weight proportion of the flake graphite to the resin component in this resin composition was 50:10. An electroconductive separator was fabricated that, apart from utilizing this resin composition, was the same as in Embodied Example 1, and the same evaluation was made. The electroconductive resin layer was made to be approximately 50 $\mu$m in thickness. As a result, the durability, though an initial voltage turned out to be somewhat lower, improved greatly, compared to the cells indicated in FIG. 2 in which the acrylic resin and poly(vinyl chloride) were utilized.

The initial voltage turning out to be lower is thought to be because the initial electroconductivity of the electroconductive resin layer in which the poly(amide-imide) resin is utilized is lower than that of the electroconductive resin layer in which the acrylic resin and poly(vinyl chloride) are utilized.

EMBODIED EXAMPLE 4

When the single cell in Embodied Example 2 was operated more than 500 hours, the output voltage dropped 10% or more compared to the start. Therein, an electroconductive separator was fabricated that, apart from utilizing a vitreous carbon powder (approx. 20 $\mu$m mean particle diameter) instead of flake graphite, was the same as in Embodied Example 2, and the same evaluation was made.

As a result, even with the elapse of 500 hours after the single cell was launched into operation, the voltage drop was less than 3%. Nevertheless, because the electroconductivity of vitreous carbon is low compared to flake graphite, the output voltage lowered slightly.

EMBODIED EXAMPLE 5

Respective electroconductive separators were fabricated that, apart from utilizing, instead of flake graphite, acetylene black of 140 $m^2/g$, 100 $m^2/g$, and 60 $m^2/g$ specific surface areas, were the same as in Embodied Example 2, and the same evaluation was made. As a result, it was evident that if the specific surface area is smaller than 100 $m^2/g$, the single-cell's durability is efficaciously improved.

EMBODIED EXAMPLE 6

Instances in which a layer including metallic Zn, metallic Sn, metallic Al, a Cr-containing compound, a Mo-containing compound or a W-containing compound was formed in between the metal substrate and the electroconductive resin layer were investigated.

A Zn layer a few $\mu$m in thickness was formed by vapor deposition on the surface of a sheet of carbon steel 500 $\mu$m in thickness. An electroconductive separator was fabricated that, apart from utilizing this metal substrate, was the same as in Embodied Example 4, and the same evaluation was made. Likewise, instances in which Sn and Al were utilized in place of Zn were similarly investigated.

Furthermore, an instance was similarly evaluated in which a layer a few $\mu$m in thickness of chromium oxide, molybdenum oxide and titanium oxide in place of the Zn layer was formed on the surface of the carbon-steel sheet by a sputtering method.

As a result, for whichever cell, the output drop following 500 running hours elapsed post-start was in the 2% range. The initial voltages were somewhat lower for the instances in which the layer of Al or oxides was formed on the surface of the metal substrate. This is thought to originate in increased resistance due to the Al or oxide layer.

Further, instances in which resins, such as poly(vinyl chloride), that do not have water-repellent and basic properties were utilized in place of the copolymer of tetrafluoroethylene and hexafluoropropylene were similarly investigated.

As a result, it was evident that forming a metal or oxide layer in between the metal substrate and the electroconductive resin layer improved the electroconductive separator durability even wherein the electroconductive resin layer did not have water-repellent and basic properties.

EMBODIED EXAMPLE 7

Powders of 5 $\mu$m, 10 $\mu$m, 25 $\mu$m and 50 $\mu$m mean diameter were obtain by pulverizing vitreous carbon in a ball-mill. Electroconductive separators were fabricated that, apart from utilizing these powders as electroconductive particulate substances, were the same as in Embodied Example 4, and the same evaluation was made. It was understood as a result that the smaller the powder particle diameter and the greater the powder content in the electroconductive resin layer, the higher the initial voltage of the cell. Likewise, the larger the powder particle diameter and the smaller the powder content in the electroconductive resin layer, the higher the durability of the cell.

INDUSTRIAL APPLICABILITY

The present invention enables in a fuel cell long-term control of increase in contact resistance of the gas-diffusion electrode and electroconductive separator, and of output deterioration due to corrosion in the electroconductive separator.

The invention claimed is:

1. A polymer-electrolyte fuel cell, comprising:
   an electrolyte membrane-electrode assembly comprising a polymer-electrolyte membrane, and a pair of gas-diffusion electrodes sandwiching said polymer-electrolyte membrane;
   a first electroconductive separator having a gas channel for supplying an oxidant gas to one of the gas-diffusion electrodes of said pair; and
   a second electroconductive separator having a gas channel for supplying a fuel gas to the other of the gas-diffusion electrodes of said pair; wherein
   the polymer-electrolyte fuel cell is characterized in that at least one of said first electroconductive separator and said second electroconductive separator comprises a metal substrate and an electroconductive resin layer provided on said metal substrate and contacting said electrolyte membrane-electrode assembly, and
   said electroconductive resin layer comprises a resin having at least one of water-repellant and basic radicals, and an electroconductive particulate substance which comprises a vitreous carbon powder having a specific surface area of less than 100 $m^2/g$ and having a mean particle diameter of approximately 5 to 50 $\mu m$.

2. The polymer-electrolyte fuel cell in accordance with claim 1, further comprising a layer including at least one selected from the group consisting of: metallic Zn, metallic Sn, metallic Al, Cr-containing compounds, Mo-containing compounds and W-containing compounds, between said metal substrate and said electroconductive resin layer.

* * * * *